Figure 1:
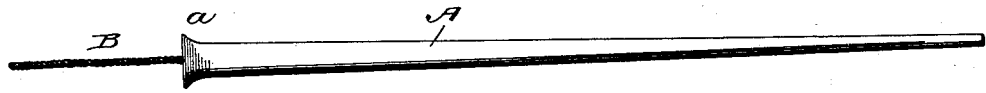

(No Model.)

D. E. BENTZEL.
TRACHEAL PROBANG.

No. 579,947.  Patented Apr. 6, 1897.

Witnesses:

Inventor:
David E. Bentzel
by R. G. Dyrenforth,
his Attorney.

UNITED STATES PATENT OFFICE.

DAVID E. BENTZEL, OF BENTZEL, PENNSYLVANIA.

TRACHEAL PROBANG.

SPECIFICATION forming part of Letters Patent No. 579,947, dated April 6, 1897.

Application filed November 29, 1895. Serial No. 570,507. (No model.)

*To all whom it may concern:*

Be it known that I, DAVID E. BENTZEL, a citizen of the United States, residing at Bentzel P. O., in the county of York and State of Pennsylvania, have invented certain new and useful Improvements in Instruments for Removing Accumulations or Deleterious Matter from the Trachea of Fowls and other Animals; and I do hereby declare the following to be a full, clear, and exact description of the invention, such as will enable others skilled in the art to which it appertains to make and use the same.

This invention relates to an instrument for removing accumulations or deleterious matter from the trachea of fowls and other animals.

The object is to produce an instrument which will in a ready, efficient, rapid, and certain manner remove accumulations—such as gape-worms or false membrane such as that accompanying diphtheria—from the trachea of fowls without any danger either of asphyxiating or of injuring the fowl or of causing it unnecessary pain; furthermore, to produce an instrument of the above description which shall combine high efficiency and durability in use with simplicity of construction and cheapness of manufacture.

With these objects in view the invention consists in the device hereinafter described and claimed.

In the accompanying drawings, forming a part of this specification, and in which like letters of reference indicate corresponding parts, I have illustrated one form of embodiment of my invention, although other forms of embodiment thereof may be employed without departing from the spirit of the same, and in the drawings—

Figure 2:

Figure 1 is a view in side elevation showing the instrument as it appears when ready for use. Fig. 2 is a longitudinal sectional view showing the arrangement of the rod or handle and the brush carried thereby.

Referring to the drawings, A designates a tube, of any suitable material combining lightness, strength, and non-corrosiveness; B, a rod or handle incased by the tube, and C a brush formed of stiff projections in the nature of bristles carried by the rod and fitting within the tube.

The tube A is preferably tapered in order to furnish a space for the passage of air between its walls and the periphery of the brush when the same occupies a position near the enlarged or outer end of the tube, and is provided at its outer end with a flaring or bell-shaped mouth *a*, which may be either integral with the tube or secured thereto, designed to facilitate the entrance of the brush within the tube and also to prevent the cutting or breaking of the bristles or projections which might result if the large end were straight, the small end of the tube being of a size to permit of its introduction into the trachea of a fowl without any danger of injuring that part or of causing unnecessary pain.

The brush is to be, preferably, somewhat larger in cross-diameter—that is, in cross-section—than the interior of the tube when this is a cylinder, and is also somewhat greater, in similar manner, than the interior of the operative end of the tube when this is tapered. In practice the tapered tube will be preferred for the reason that it will be easier to insert into the trachea, and, further, that in the act of pushing the brush downward and without the small end the bristles will be compressed or turned backward, so that as soon as released they will spring to their normal position and in so doing will dislodge and occlude any foreign substance with which they may contact. This will be especially true where gape-worms are to be removed, as the bristles will first dislodge them and the spaces between the bristles will operate to catch and hold them until the brush is withdrawn.

The rod B may be constructed of two or more thin wires twisted together, with the bristles held between the turns or whirls of the wires, as shown, or of a straight piece of wire with the brush as a separate element secured thereto, or of a straight piece of wire having its end cleft to receive the bristles, after which the cleft portion may be twisted so as to form the bristles into a cylindrical brush; but for cheapness and ease of production the form first described will in most instances be preferred.

In operation the small end of the tube is inserted the proper distance into the trachea of a fowl in such a manner as not to disturb any accumulation of foreign matter therein, the brush being away from this end of the tube in order to allow air to pass through the tube to the lungs of the fowl to prevent asphyxiation. The rod B is now pushed down until the brush is free of the tube, thus loosening or dislodging any foreign substance with which the bristles may contact, and the tube and brush are then drawn out, causing the projections or hooks to catch or occlude and remove whatever foreign substance there is in the trachea.

In most instances a single operation is all that is necessary to give immediate relief, but, if necessary, the operation may be repeated without danger.

Having thus fully described my invention, what I claim as new, and desire to secure by Letters Patent, is—

An instrument for removing accumulations from the throats of fowls, comprising a rigid tapering tube and a rod, the rod having one end provided with stiff lateral projections in the nature of bristles, constituting a brush, and this brush being of greater diameter in cross-section than the interior of the operative end of the tube, whereby, when inserted, with the tube, into the throat of a fowl and moved beyond the inserted end of the tube, the bristles will spring outward, initially to dislodge any foreign substance in the throat and, when withdrawn, will catch or occlude and remove the dislodged substance, substantially as described.

In testimony whereof I affix my signature in presence of witnesses.

DAVID E. BENTZEL.

Witnesses:
 A. J. MYERS,
 C. LIGHTNE,
 H. H. QUICKEL.